United States Patent [19]

Asano

[11] Patent Number: 5,282,142
[45] Date of Patent: Jan. 25, 1994

[54] EMBROIDERY MACHINE THAT ADJUSTS THE INCLINATION ANGLE OF EMBROIDERY STITCHES

[75] Inventor: Fumiaki Asano, Nagoya, Japan

[73] Assignee: Brother Kogyo Kabushiki Kaisha, Nagoya, Japan

[21] Appl. No.: 760,096

[22] Filed: Sep. 16, 1991

[30] Foreign Application Priority Data

Oct. 25, 1990 [JP] Japan .................. 2-289213

[51] Int. Cl.$^5$ .............................. D05B 21/00
[52] U.S. Cl. ................. 364/470; 112/121.12; 112/103
[58] Field of Search ........... 364/470; 112/103, 121.12, 112/454, 157, 121.13, 78, 80.15, 80.18, 81, 84

[56] References Cited

U.S. PATENT DOCUMENTS

| | | | |
|---|---|---|---|
| 4,352,334 | 10/1982 | Childs et al. | 112/103 |
| 4,598,655 | 7/1986 | Takenoya | 112/103 |
| 4,622,907 | 11/1986 | Kimura | 112/454 |
| 4,998,489 | 3/1991 | Hisatake et al. | 364/470 |
| 5,005,500 | 4/1991 | Kata et al. | 364/470 |
| 5,035,193 | 7/1991 | Hanyu | 112/454 |

*Primary Examiner*—Jerry Smith
*Assistant Examiner*—Jim Trammell
*Attorney, Agent, or Firm*—Oliff & Berridge

[57] ABSTRACT

An embroidery data producing apparatus for an embroidery machine which forms embroidery stitches, based on the embroidery data having information about stitch positions comprises a CPU, RAM and ROM. The RAM has a pattern data memory for storing pattern data which represents outlines of a pattern where embroidery will be given, and a embroidery data memory for storing the made embroidery data. The CPU reads the pattern data stored in an external memory device and stores the pattern data in the pattern data memory. The CPU stores the inclination angle input through the keyboard by an operator in the RAM. The CPU sets a pair of facing outlines which extend to a predetermined embroidery executing direction based on the pattern data stored in the pattern data memory. The CPU sets stitch positions on the first outline of a pair of the outlines according to a predetermined thread density. The CPU calculates the straight line which passes through the set stitch position and inclines at set inclination angle toward the embroidery executing direction. The CPU calculates the intersection where the calculated straight line and the second outline of a pair of the outlines intersect, and sets the intersect as a next stitch position following the set stitch position. The CPU stores the stitch positions set on the first outline and the stitch positions calculated on the second outline as the embroidery data in the embroidery data memory.

12 Claims, 9 Drawing Sheets

Fig.3B

| ITEM | INSTRUCTIONS |
|---|---|
| S1 | SET A PAIR OF OUTLINES |
| S2 | READ INCLINATION ANGLE $\alpha$ |
| S3 | CALCULATE CENTER POINT O |
| S4 | SET STITCH POSITIONS ON INNER LINE |
| S5 | STORE NUMBER N OF STITCH POSITIONS ON INNER LINE |
| S6 | $P \leftarrow 1$ |
| S7 | SET START POINT & NUMBER STITCH POSITIONS ON INNER LINE |
| S8 | SET PTH POINT AS NEXT STITCH POSITION |
| S9 | CALCULATE STITCH POSITION ON OUTER LINE BASED ON INCLINATION ANGLE $\alpha$ |
| S10 | SET CALCULATED STITCH POSITION AS STITCH POSITION FOLLOWING PTH POINT |
| S11 | $P \leftarrow P+1$ |
| S12 | $P \leq N$ |

Fig.6B

| ITEM | INSTRUCTIONS |
|---|---|
| S21 | SET A PAIR OF OUTLINES |
| S22 | READ INCLINATION ANGLE α |
| S23 | SET LONGER OUTLINE AS FIRST OUTLINE |
| S24 | SET STITCH POSITIONS ON FIRST OUTLINE |
| S25 | P←1 |
| S26 | SET STARTING POINT & TERMINAL POINT |
| S27 | NUMBER STITCH POSITIONS ON FIRST OUTLINE |
| S28 | STORE NUMBER N OF STITCH POSITIONS ON FIRST OUTLINE |
| S29 | SET PTH POINT AS NEXT STITCH POSITION |
| S30 | CALCULATE STITCH POSITION ON SECOND OUTLINE BASED ON INCLINATION ANGLE α |
| S31 | SET CALCULATED STITCH POSITION AS STITCH POSITION FOLLOWING PTH POINT |
| S32 | P←P+1 |
| S33 | P≦N |

EMBROIDERY MACHINE THAT ADJUSTS THE INCLINATION ANGLE OF EMBROIDERY STITCHES

BACKGROUND OF THE INVENTION

1. Field of the Invention

The present invention relates to an embroidery data producing apparatus for an embroidery machine, and more particularly, to an embroidery data producing apparatus for producing the embroidery data which represents stitch positions on a pair of facing outlines extending in an embroidery executing direction.

2. Description of Related Art

An embroidery machine for embroidering a predetermined pattern, such as a one point mark, comprises a needle bar driving mechanism for reciprocating a needle bar which includes a needle at an end portion thereof, a horizontal moving mechanism for moving a work fabric in a horizontal plane, and a control device for controlling the needle bar driving mechanism and the horizontal moving mechanism. The control device controls the needle bar driving mechanism and the horizontal moving mechanism such that the needle can drop into each stitch position in sequence based on the embroidery data which represents stitch positions corresponding to the predetermined pattern. The embroidery data which represents stitch positions is automatically made by the embroidery data producing apparatus.

The embroidery data producing apparatus comprises a microcomputer, input devices such as an image scanner or a keyboard, and an external memory device. The external memory device stores the pattern data which represents an outline of the pattern, i.e., outline of an area which is filled with embroidery stitches. The microcomputer reads the pattern data stored in the external memory device and produces the embroidery data by calculating each stitch position based on the pattern data.

As shown in FIG. 9, in the case where the shape of an embroidery pattern 1 is a circle, the pattern data is made with the coordinate values which represent a plurality of points on an outer line 2 and an inner line 3 which outline the circle. First, the embroidery data producing apparatus calculates the coordinates values representative of the center point O of the pattern 1. The embroidery data producing apparatus then radially draws straight lines, the number of which is set according to a predetermined thread density, from the center point O. The embroidery data producing apparatus calculates the coordinate values which represent points of intersection of these straight lines alternating between the outer line 2 and the inner line 3 to represent stitch positions. During sewing, the needle follows the sequence between the outer line 2 and the inner line 3 of the pattern 1, for example in the clockwise direction, on the work fabric based on the embroidery data. As the result, the inside of the pattern 1 is filled with the embroidery stitches as shown.

The above-mentioned embroidery data producing apparatus produces the embroidery data for forming embroidery stitches which connect in sequence a pair of outlines. The embroidery stitches which are formed based on the embroidery data are substantially at a right angle to the pattern outline or a line parallel thereto defining the embroidery executing direction. The embroidery executing direction is the direction in which the pattern is formed, for example, from right to left, from top to bottom, clockwise or counterclockwise. A line commencing at a mid-point between the pair of outlines, adjacent the first stitch position, and passing parallel (to and through the midpoints) between the pair of outlines to a point adjacent a last stitch position defines an axis of the embroidery executing direction.

However, when embroidery stitches are formed at a substantially right angle with the axis of the embroidery executing direction (hereinafter called embroidery execution direction) and the interval between a pair of the outlines is narrow, the length of the stitches become very short. Because of this, the work fabric wrinkles and the stitches are denser or more compact and the lower thread may be pulled out through the upper surface of the work fabric. Therefore, neat embroidery stitches are not formed.

SUMMARY OF THE INVENTION

An object of the invention is to provide an embroidery data producing apparatus for producing embroidery data which produces neat embroidery stitches even if the interval between a pair of the outlines is narrow.

To achieve the above-mentioned object, according to the invention, the embroidery data producing apparatus for an embroidery machine, which forms embroidery stitches based on the embroidery data about stitch positions, comprises: storing means for storing pattern data which represents outlines of a pattern to be covered with embroidery stitches formed by the embroidery machine; outline setting means for setting a pair of facing outlines which extend in a predetermined embroidery executing direction based on the pattern data stored in the storing means;

inclination angle setting means for setting an inclination angle of each of the embroidery stitches with respect to the predetermined embroidery executing direction; and stitch position calculation means for calculating stitch positions on a pair of outlines which is set by the outline setting means based on the inclination angle set by the inclination angle setting means.

In the embroidery data producing apparatus of the invention, the storing means stores pattern data for representing outlines of a pattern to be covered with embroidery stitches which are formed by the embroidery machine. The outline setting means sets a pair of facing outlines which are separated from one another in the predetermined embroidery executing direction based on the pattern data stored in the storing means. The inclination angle setting means sets an inclination angle of each of embroidery stitches with respect to the predetermined embroidery executing direction. The stitch position calculation means calculates stitch positions on the pair of outlines which is set by the outline setting means based on the inclination angle set by the inclination angle setting means.

Therefore, embroidery stitches are formed based on the embroidery data which is made by the embroidery data producing apparatus of the invention so as to extend from each of the stitch positions on the first outline of a pair of the outlines to each of the stitch positions on the second outline and be inclined at a predetermined angle with respect to the embroidery executing direction. In this case, if an inclination angle set by the inclination angle setting means is altered, embroidery stitches can be formed so as to incline not only at a right angle but also at various angles with respect to the embroidery executing direction.

According to the embroidery data producing apparatus of the present invention, embroidery data is made so that embroidery stitches incline not only at a right angle but also at various angles with respect to the embroidery executing direction. Therefore, despite the narrow interval between a pair of outlines extending in the embroidery executing direction, the length of the embroidery stitches which connect a pair of the outlines with each other does not become extremely short. The short distance between outlines is compensated for by setting a suitable inclination angle with the inclination angle setting means to produce a longer stitch. Because of this, the embroidery data for forming neat embroidery stitches can be made. Moreover, since the inclination angle of each embroidery stitch can be set to be a desired angle, a variety of embroidery patterns and designs can be formed on a work fabric to have a neat appearance.

BRIEF DESCRIPTION OF THE DRAWINGS

A preferred embodiment of the invention will be described in detail with reference to the following figures wherein:

FIG. 3B is a table of labels for the flowchart of FIG. 3A;

FIG. 6B is a table of labels for the flowchart of FIG. 6A;

DETAILED DESCRIPTION OF THE PREFERRED EMBODIMENT

Hereinafter, a first example of the invention will be described with reference to FIGS. 1-5.

Figure 1:
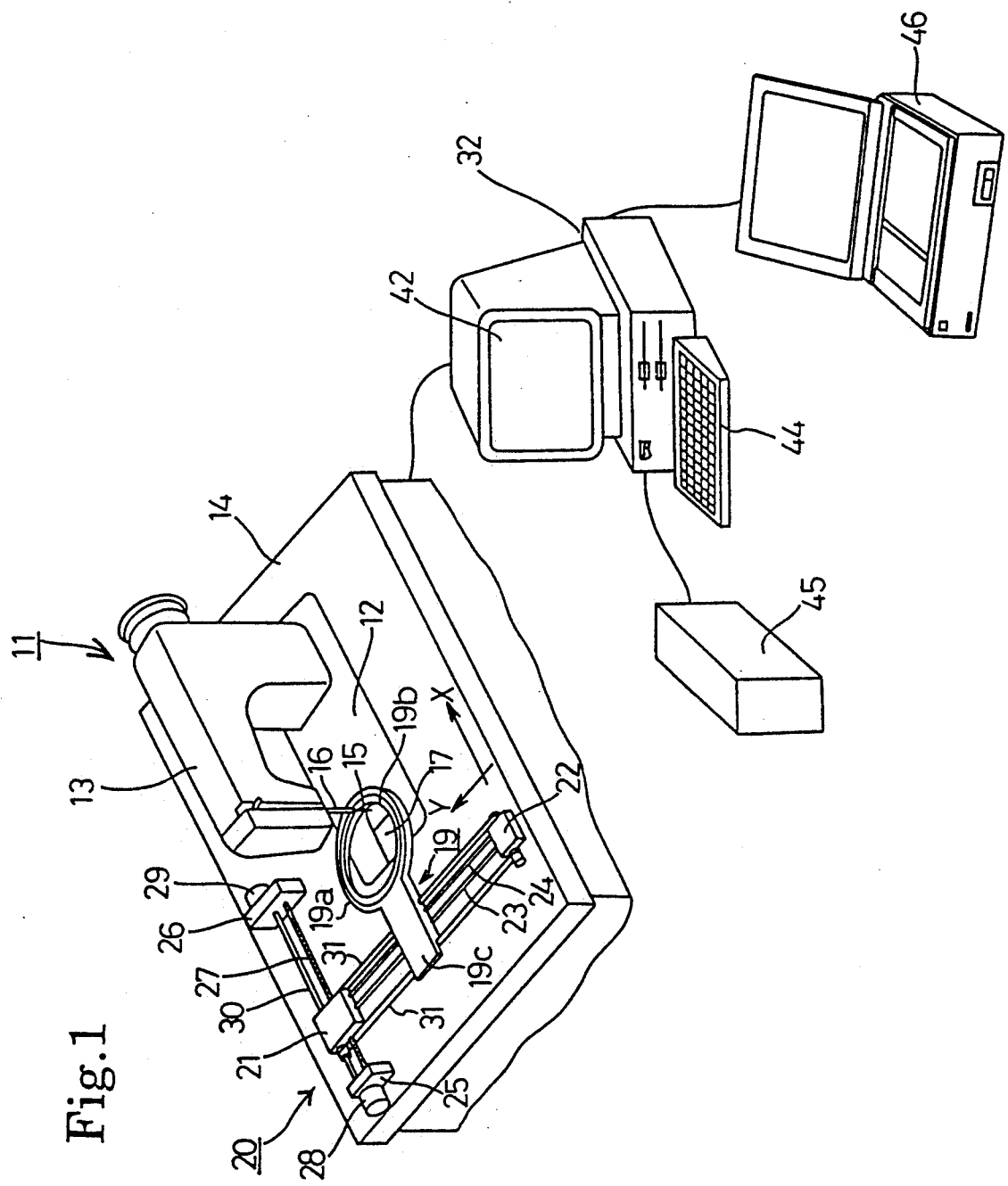
FIG. 1 is a perspective view showing the components of the embroidery data producing apparatus of the invention and an embroidery machine to which the embroidery data producing apparatus is connected.
Figure 2:
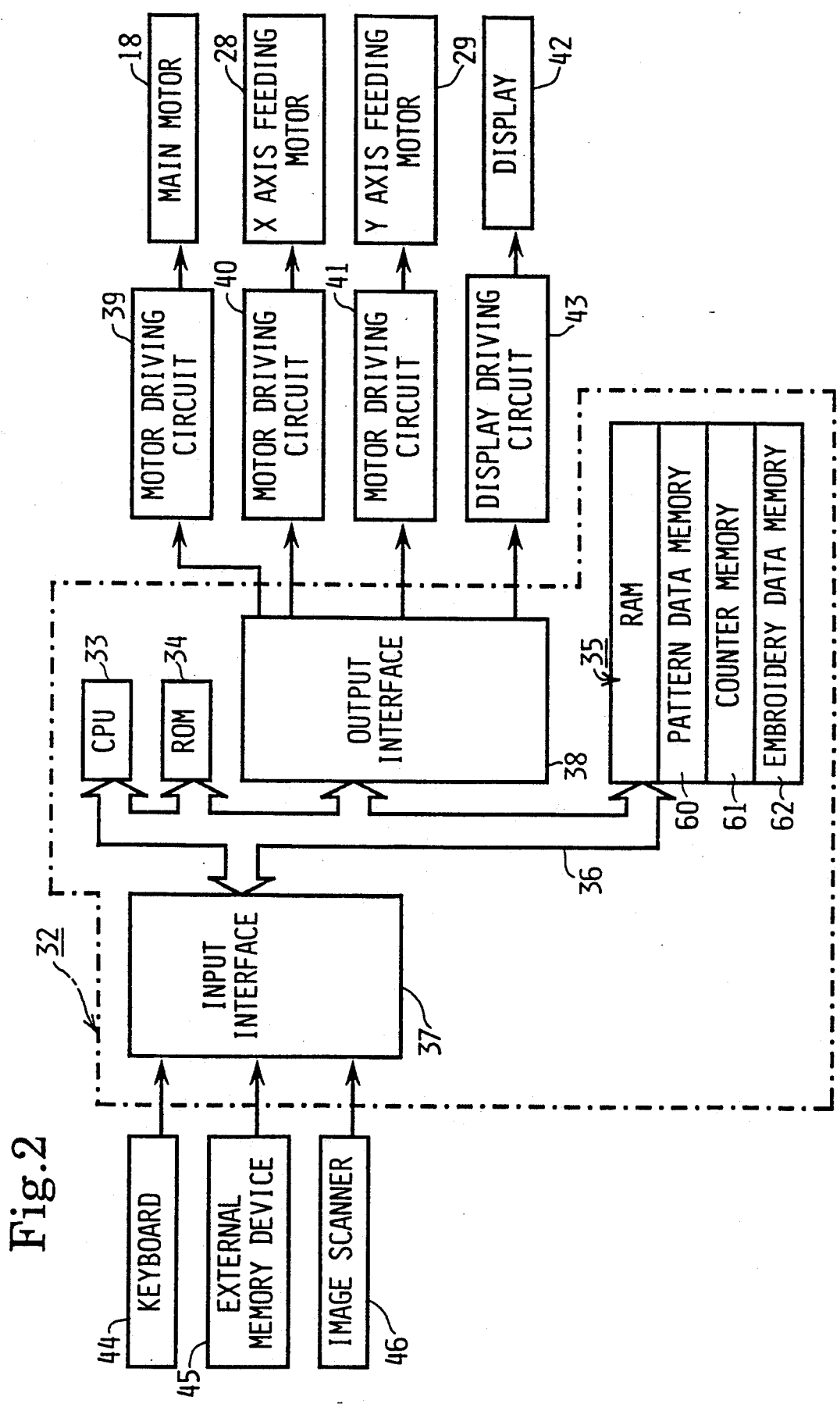
FIG. 2 is a block diagram showing the electrical structure of the embroidery data producing apparatus and the embroidery machine.

First, the main structure of an embroidery machine will be described with reference to FIG. 1. A main body 11 of the embroidery machine comprises a bed 12 and an arm 13 extended above the bed 12. The bed 12 is seated in and forms part of a table 14. A needle bar 16 having a needle 15 is supported so as to move vertically under the head portion of the arm 13. A throat plate 17 is provided on the bed 12. A needle hole where the needle 15 pierces is formed in the throat plate 17. The needle bar 16 is driven vertically, through a needle bar drive mechanism provided in the arm 13, by a main motor 18 (FIG. 2). A loop taking mechanism is provided in the bed 12 below the throat plate 17. The loop taking mechanism is driven in synchronization the needle bar 16 by the main motor 18.

An embroidery frame 19 for holding a work fabric is mounted on the table 14. The embroidery frame 19 has an outer frame 19a having an annular shape and an inner frame 19b which has an annular shape and is detachably mounted in the outer frame 19a. The work fabric is stretched on the inner frame 19b by being held between the outer frame 19a and the inner frame 19b.

The embroidery frame 19 can be moved to any position relative to the table 14, to place a stitch position beneath needle 15, by a horizontal moving mechanism 20. A slide plate 19c is integrally provided to a sector of the outer frame 19a. The slide plate 19c is slidably supported by two slide bars 23, 24 which are provided between support stands 21, 22 and extend in the Y-axis direction. Motor installation stands 25, 26 are provided on the table 14. A feeding screw 27 is supported rotatably between the motor installation stands 25, 26 to extend in the X axis direction which is orthogonal to the slide bars 23 and 24. The support stand 21 is engaged to the feeding screw 27. The feeding screw 27 is driven to rotate by an X axis feeding motor 28 provided on the motor installation stand 25. Therefore, when the feeding screw 27 is driven and rotated by the X axis feeding motor 28, the embroidery frame 19, as well as the support stands 21, 22 and the slide bars 23, 24, is moved along the X axis.

A rotation transmitting axis 30, extending in the X axis direction, is also rotatably supported between the motor installation stands 25, 26. The rotation transmitting axis 30 is driven to rotate by a Y axis feeding motor 29 provided on the motor installation stand 26. The rotation transmitting axis 30 drives wires 31, 31 mounted between the support stands 21 and 22. The slide plate 19c is fixed to the wires 31, 31. Therefore, when the rotation transmitting axis 30 is rotated by the Y axis feeding motor 29, the embroidery frame 19 is moved along the Y axis by the wires 31 and 31. As described above, the work fabric set in the embroidery frame 19 can therefore be moved to any position relative to the table 14 to properly position the stitch position by the X axis feeding motor 28 and the Y axis feeding motor 29 that comprise the horizontal moving mechanism 20.

The embroidery machine as described above is controlled by a control device 32. The control device 32 (FIG. 2) has a microcomputer consisting of CPU 33, ROM 34, and RAM 35 which are connected to one another through bus 36. The RAM 35 has a pattern data memory 60 for storing pattern data which represents an outline of the embroidery pattern, a counter memory 61 functioning as a counter (to be described) and an embroidery data memory 62 for storing the embroidery data which represents stitch positions. The ROM 34 stores a control program, for controlling the embroidery machine based on the embroidery data, and an embroidery data producing program for executing an embroidery data producing process described below. The control device 32 has an input interface 37 and an output interface 38 which are connected to the bus 36. A motor driving circuit 39 for driving the main motor 18, a motor driving circuit 40 for driving the X axis feeding motor 28, a motor driving circuit 41 for driving the Y axis feeding motor 29, and a display driving circuit 43 for driving a display 42 are connected to the output interface. The control device 32 controls the main motor 18, the X axis feeding motor 28, and the Y axis feeding motor 29, based on the embroidery data, so that the work fabric is moved by the horizontal moving mechanism 20 and the needle bar 16 is moved vertically. As the result, predetermined embroidery stitches are automatically formed on the work fabric. Moreover, a keyboard 44, an external memory device 45, and an image scanner 46 are connected to the input interface 37.

The control device 32 functions as the embroidery data producing apparatus. The control device 32 determines the embroidery data which represent stitch positions based on the pattern data. According to the embroidery data made by the control device 32, the stitch positions are arranged in sequence on a pair of outlines which are facing each other and extend in an embroidery executing direction. The pattern data for representing the outlines of the pattern is needed in order to make the embroidery data. The external memory device 45 has stored therein pattern data corresponding to patterns such as letters and symbols. The image scanner 46 reads symbols input by an operator through a keyboard or other input devices and makes pattern data corresponding to the read symbols. The external memory device 45 can store the pattern data made by the image scanner 46. The display 42 displays the embroidery pattern based on the pattern data.

Figure 5:
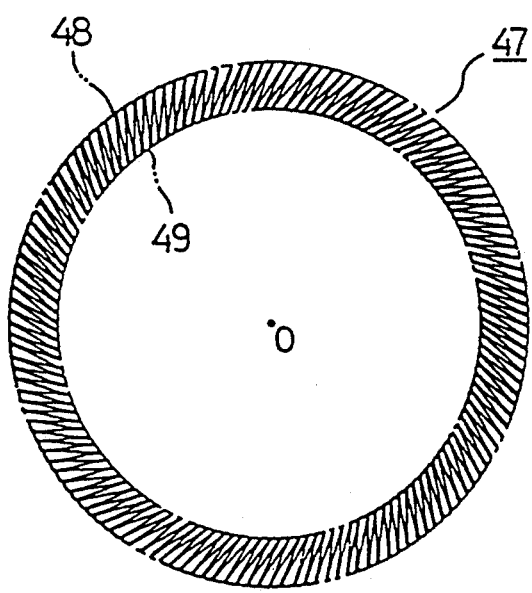
FIG. 5 is a figure showing embroidery stitches applied to the outline.

If the shape of the embroidery pattern 47 is a circle having a constant width such as shown in FIG. 5, the pattern data represents an outer line 48 and an inner line 49 which compose the outline of the pattern 47. That is, the pattern data has information about the coordinate values which represent three arbitrary points on the outer line 48, the coordinate values which represent one arbitrary point on the inner line 49, and the circle shape of the pattern 47. Further the pattern data has data which represents the embroidery executing direction. According to the embroidery data, the embroidery operation for forming embroidery stitches which connect in sequence the inner line 49 and the outer line 48 of the circle pattern 47 is preset to progress in a clockwise direction. Further the embroidery data includes data which represents thread density. The thread density represents the number of embroidery stitches connecting a pair of outlines per millimeter. In the present embodiment, according to the predetermined thread density, five embroidery stitches per millimeter of the pattern are formed.

The control program in ROM 34 of the control device 32 contains an inclination angle setting process for setting an inclination angle of the embroidery stitches with respect to the embroidery executing direction, stitch position setting means for setting stitch positions on a first outline of a pair of the outlines, straight line operating means for defining a straight line passing through the stitch position set by the stitch position setting means and inclining the line with respect to the embroidery executing direction (the inclination angle with respect to the embroidery executing direction is predetermined by the inclination angle setting means), and stitch position calculating means for calculating the intersection where the straight line operated by the straight line operating means and the second outline intersect, and setting the intersection as a next stitch position which follows the stitch position set by the stitch position setting means. The operator can operate the keyboard 44 to input a desired inclination angle $\alpha$ to the control device 32 as a setting angle which is stored in the RAM 35.

Figure 3A:
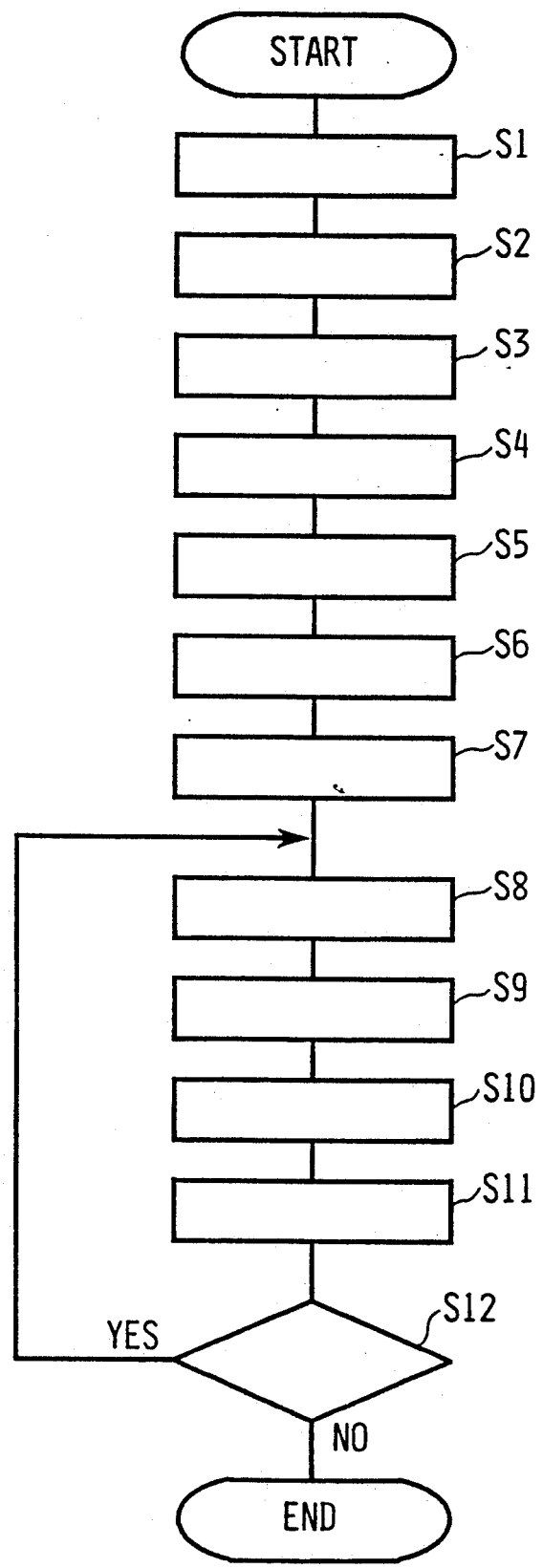
FIG. 3A is a flowchart showing a first example of the embroidery data producing process executed by the embroidery data producing apparatus.
Figure 4:
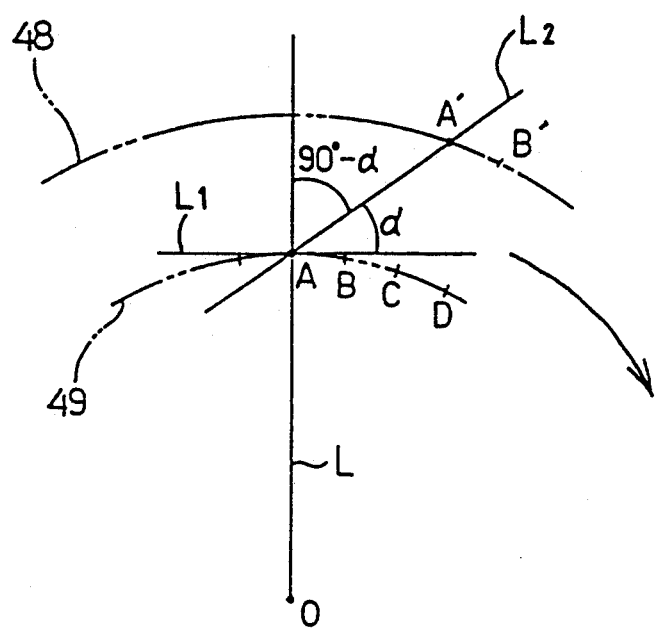
FIG. 4 illustrates the procedure for producing the embroidery data in the first example.

Next, the embroidery data producing process of the present embodiment will be explained with reference to FIGS. 3 through 5. Using the example of a circle pattern 47 (FIG. 5), when the circle pattern 47 is selected using the keyboard 44, the pattern data corresponding to the pattern 47 is read from the external memory device 45 and stored in the pattern data memory 60 of the RAM 35. The embroidery data producing program, stored in ROM 34 of the CPU 33, executes the embroidery data producing process shown in the flowchart of FIGS. 3A and 3B.

First, in step Si, the CPU 33 reads the pattern data from the pattern data memory 60 and sets an inner line 49 and an outer line 48 as a pair of outlines. In step S2, the CPU 33 reads the inclination angle $\alpha$ input by the way of the keyboard 44 and stored in the RAM 35. In step S3, the CPU 33 calculates the coordinate values representing the center point 0 of the circle pattern 47 based on the pattern data. In step S4, the CPU 33 selects the inner line 49 as the first outline of the pair of outlines. The CPU 33 divides the inner line 49 at equal intervals according to the predetermined thread density and sets stitch positions on the inner line 49, such as positions A, B, C, . . . In this first example, the thread density is set to be five embroidery stitches per millimeter. Thus, the interval between adjoining stitch positions is 0.4 mm on the inner line. In step S5, the CPU 33 stores, in RAM 35, a number N which is the number of stitch positions set in step S4. In step S6, the CPU 33 sets count value P of the counter memory 61 in RAM 35 to be 1.

In step S7, the CPU 33 sets a start point (position A) where the sewing operation will be started. Since the shape of the pattern 47 is a ring, the sewing operation may be started from any of the defined stitch positions. Therefore, an arbitrary stitch position on the inner line 49 is set as the start point and the CPU 33 then consecutively numbers each stitch position set on the inner line 49. The position A is set as the start point as point 1, point 2 (position B), point 3 (position C) . . . the Nth position will be given the appropriate consecutive number in the embroidery executing direction (the clockwise direction). In step S8, the CPU reads the count value P of the counter memory 61 and sets the Pth point as the next stitch position and stores the Pth point in the embroidery data memory 62 of the RAM 35. Since the count value P of the counter memory 61 is 1 when the process in step S8 is executed for the first time, the start position A is the first point set as the next stitch position.

In step S9, based on the inclination angle $\alpha$, the CPU 33 calculates the stitch position on the outer line 48, which is the second outline of the pair of outlines, as the stitch position following the Pth point. In step S10, the CPU 33 sets the stitch position calculated in step S9 as the stitch position following the Pth point, and stores it in the embroidery data memory 62 of the RAM 35.

Calculation of the stitch position in step S9 will be explained with reference to FIG. 4. Using position A as the Pth point, for example, the CPU 33 calculates the straight line L which passes through the center point O and the point A. Next, the CPU calculates the straight line L2 which passes through position A and inclines at $(90-\alpha)$ degrees with respect to the straight line L. The straight line L is orthogonal to a tangent line tangent to inner circle 49, L1, which passes through the position A and is parallel with the embroidery executing direction adjacent point A. Therefore, the straight line L2 which passes through position A and inclines at $(90-\alpha)$ degrees with respect to the straight line L inclines at $\alpha$ degrees with respect to the embroidery executing direction at position A. Finally, the CPU 33 calculates the intersection A' where the straight line L2 and the outer line 48 intersect each other. And, in step S10, the intersection A' is set as the stitch position following the position A.

In step S11, the CPU 33 adds one to the count value P of the counter memory 61. In step S12, the CPU 33 compares the count value P of the counter memory 61 with the number N, which is the number of the stitch positions, set in step S4. The CPU 33 judges if the count value P is the number N or less. If the judgement is YES, the CPU 33 returns to step S8 and the process of steps S8–S12 are repeated. In repeating the process of step S8–S12, the second point, position B is set as the stitch position following the position A, and point B' is set as the stitch position following the position B. When the Nth position is set as the stitch position with the result that step S8–S12 processing is repeated, the CPU will then judge "NO" in step S12, so that, the embroidery data producing process is finished.

When the embroidery data producing processing is finished, the embroidery data, having information about stitch positions A, A', B, B', C, C', ..., N, N', is completed and stored in the embroidery data memory 62 of RAM 35. The CPU then controls the embroidery machine to execute the embroidery operation on the work fabric using the embroidery data stored in the embroidery data memory 62 and the control program stored in the ROM 34.

In the described example, when the embroidery operation is completed the work fabric has an embroidered circle pattern 47 (FIG. 5) made up of embroidery stitches called satin stitches. Each of the embroidery stitches inclines $\alpha$ degrees with respect to the embroidery executing direction and is formed on the work fabric. The operator can input the desired inclination angle $\alpha$ through the keyboard 44. Therefore, the inclination angle $\alpha$ can be varied so that the embroidery stitches can be formed not only at substantially a right angle but also at any angle with respect to the embroidery executing direction. Therefore, even if the same pattern 47 is embroidered, the direction of the embroidery stitches can be varied to produce different effects or appearances.

As mentioned above, according to the example, the embroidery data can be made so as to form not only embroidery stitches which make substantially a right angle but also embroidery stitches which are inclined with respect to the embroidery executing direction. Therefore, in case of a narrow interval between the outer line 49 and the inner line 48 which, in our example, are outlines of a ring pattern 47, the embroidery stitches can be inclined. Therefore, the length of the each embroidery stitch is lengthened, so that neat appearing embroidery is produced.

Although, as described, the stitch positions on the inner line 49 are set first, based on the thread density, and then the stitch positions on the outer line 48 are calculated based on the inclination angle $\alpha$, the invention is not limited to such a sequence. The baseline could as easily be the outer line of the pattern so that the stitch positions on the outer line 48 are first set based on the thread density, then the stitch positions on the inner line 49 are calculated based on the set inclination angle $\alpha$. Further, even if the embroidery pattern is not a circle shape, used in the example but is ellipse shaped or has another shape, the embroidery data can be calculated using known geometrical relationships.

Figure 6A:
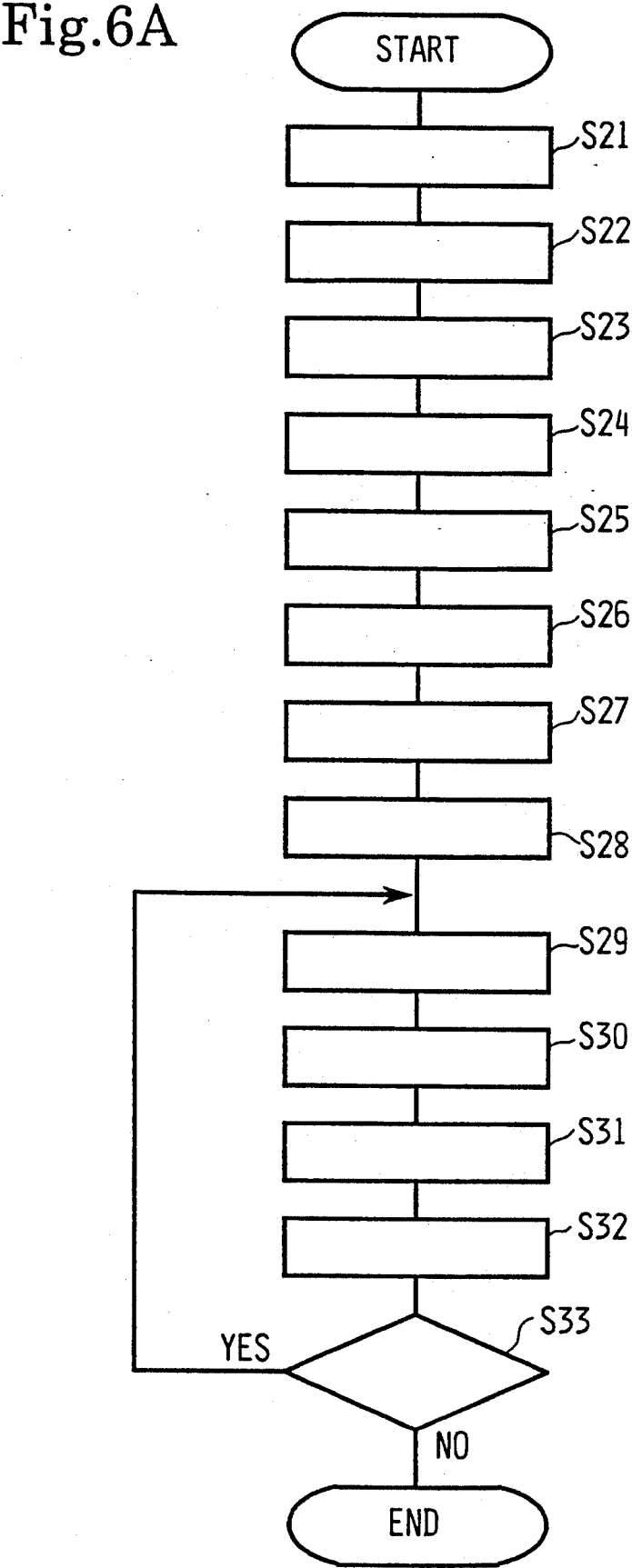
FIG. 6A is a flowchart showing the embroidery data producing process executed by the embroidery data producing apparatus in a second example of the invention.
Figure 8:
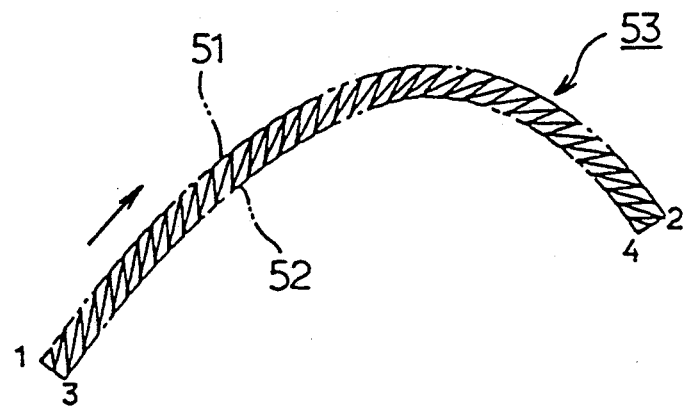
FIG. 8 is a figure showing the embroidery stitches of the second example as applied to an outline.
Figure 9:
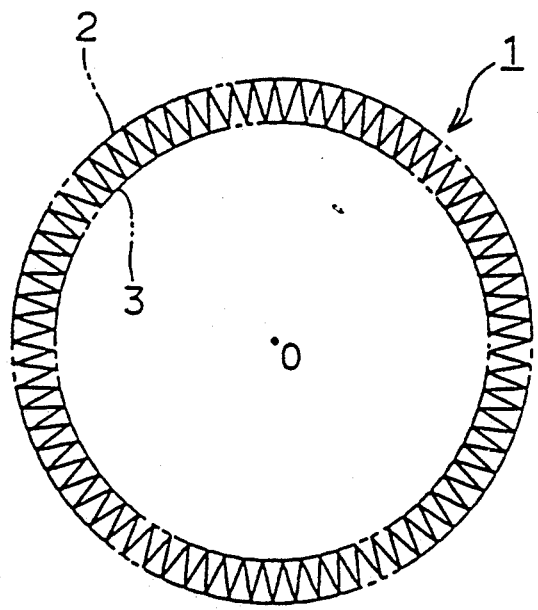
FIG. 9 is a figure showing in outline the embroidery stitches formed based on the embroidery data which is made by the embroidery data producing apparatus of the related art.

A second example of the invention will be described with reference to FIGS. 6 thorough 8. This example discusses using a pattern with a non-circular shape. In the above-mentioned first example, embroidering a circle pattern 47 was explained. In the present example, producing embroidery data for giving a non-circular embroidery pattern 53 will be explained. The pattern 53 is defined with a pair of outlines 51 and 52 which are facing each other as shown in FIG. 8. The embroidery data producing program stored in the ROM 34 differs from that of the first example and thus must be selected by the operator. On the outline 51, a point 1 is set as one end, a point 2 is set as the other end and a plurality of points for defining the shape of the outline 51 between the points 1, 2 are established. On the outline 52, a point 3 is set as one end, point 4 is set as the other end and a plurality of points for defining the shape of the outline 52 are established between the points 3, 4.

The pattern data which represents a pattern 53 has information about the coordinate values representing the points 1, 2, and the plurality of intermediate points between points 1, 2, points 3, 4, and the plurality of points intermediate between points 3, 4. The pattern data further comprises the data defining the embroidery executing direction. The embroidery operation is predetermined so as to progress in the direction of the arrow shown in FIG. 8, that is, left to right. According to the embroidery operation, embroidery stitches are formed to connect, in sequence, the outline 51 and the outline 52. The pattern data further comprises the data which represents thread density. The thread density represents the number of embroidery stitches between the pair of outlines per millimeter. In this example, the thread density is predetermined so as to form five embroidery stitches per millimeter. When a pattern 53 is selected by the way of the keyboard 44, the pattern data corresponding to the pattern 53 is read from the external memory device 45 and stored in the pattern data memory 60 of the RAM 35 and the CPU 33 executes the embroidery data processing shown in the flowchart of FIG. 6 according to the embroidery data producing program stored in the ROM 34.

First, in step S21, the CPU 33 reads the pattern data from the pattern data memory 60 and sets a pair of outlines 51, 52. In step S22, the CPU 33 reads the inclination angle $\alpha$ input by the way of the keyboard 44 and stores it in the RAM 35. In step S23, the CPU 33 compares the length of the outline 51 with that of the outline 52, and sets the longer outline (in this example, outline 51) as the first outline. In step S24, the CPU 33 divides the first outline 51 at equal intervals according to the predetermined thread density and sets stitch positions on the first outline 51, such as 1, A, B, ..., 2. In the present embodiment, since the thread density is set such that five embroidery stitches are formed per millimeter, the interval between adjoining stitch positions is 0.4 mm. In step S25, the CPU 33 sets a count value P of the counter memory 61 in the RAM 35 to be 1. In step S26, the CPU 33 sets point 1 as the starting position 1 and sets point 4 as a terminal position N. In step S27, the CPU 33 gives a number to each stitch position set on the outline 51. As the starting position is the first position or position 1, points A, B, ..., 2 will be numbered positions 2, 3, ..., N in, respectively, the embroidery executing direction (from left to right). In step S28, the CPU 33 stores the number N of the stitch positions, set in step S24, in the RAM 35. In step S29, the CPU 33 reads the count value P of the counter memory 61 and sets Pth position as a next stitch position and stores the Pth position in the embroidery data memory 62 of the RAM 35. When the process in step S29 is executed for the first time, the starting position 1, the first position, is set as the first stitch position because the count value P of the counter memory 61 is 1.

In step S30, the CPU 33 calculates a stitch position on the second outline 52 of a pair of the outlines as the stitch position following the Pth position based on the inclination angle α. In step S31, the CPU sets the stitch position calculated in step S30 as a stitch position following the Pth position and stores it in the embroidery data memory 62 of the RAM 35.

Figure 7:
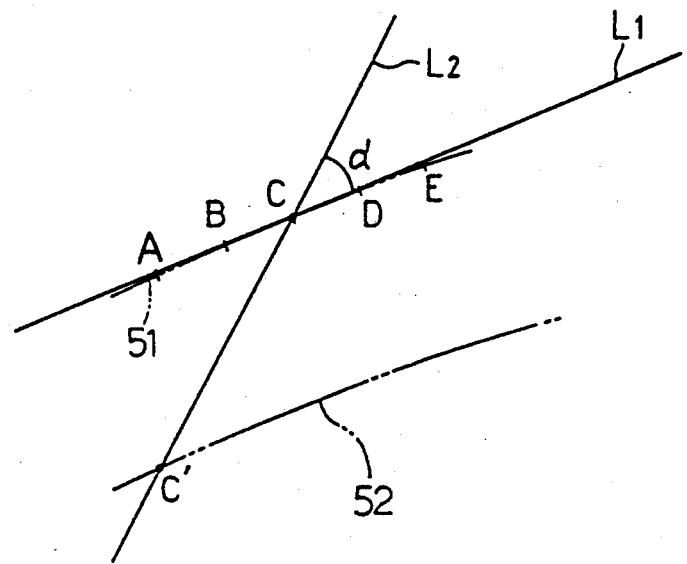
FIG. 7 illustrates the procedure for producing the embroidery data of the second example.

The way the stitch positions are calculated in step S30 will be explained with reference to FIG. 7, wherein the Pth position is point C. First, the CPU 33 calculates the straight line which passes through the C point and is parallel with the embroidery executing direction through the point C, that is, a tangent through the point C. The inclination of the tangent L1 can be given as an approximate value by calculating the average value of the inclination of the straight line which passes through the points B, C and the inclination of the straight line which passes through the points C, D. Next, the CPU 33 calculates the straight line L2 which passes through point C and inclines at α degrees with respect to the tangent L1. Finally, the CPU 33 calculates an intersection C' where the straight line L2 and the second outline 52 intersect each other. In step S31 the intersection C' is set as the next stitch position following the point C (position 4).

In step S32, the CPU 33 adds one to the count value P of the counter memory 61. In step S33, the CPU 33 compares the count value P with the number N of the stitch positions set in step S28. The CPU 33 judges if the count value P is the number N or less. If the judgement is YES, the CPU returns to step S29 and steps S29-S33 are repeated. In repeating steps S29-S33, the stitch positions that alternate between the outlines 51, 52 are calculated. When the Nth point is set as the stitch position, the CPU judges "NO" in step S33 and the embroidery data producing process is finished.

Further, at the beginning, when the straight line L2 does not intersect with the second outline 52 at the left end of the pattern 53, the point where a line connecting points 1, 3 and the straight line L2 intersect is calculated and the intersection is set as a stitch position. Moreover, if there is room in which a stitch position can be located on the second outline 52 at the right end on the pattern 53, that would normally be connected to a non-existent N+1 position, beyond the right end of first outline 51, a phantom extension of the first outline 51 is calculated and an N+1 stitch position is set on the phantom extension. Next, the straight line L2 which passes through the N+1 position is calculated. Finally, the intersections where the straight line L2 intersects the second outline 52 and a line connecting points 2-4 are calculated and the intersections set as stitch positions.

When the embroidery operation is executed based on the embroidery data made by the embroidery data producing apparatus of the present embodiment, as shown in FIG. 8, the embroidery stitches are formed so as to incline at α degrees with respect to the embroidery executing direction. Therefore, according to the embroidery data producing apparatus of the present embodiment, the embroidery data can be made to form not only the embroidery stitches which make a substantially right angle with the embroidery executing direction but also embroidery stitches which incline toward the embroidery executing direction. If the interval between a pair of outlines 51, 52 of the pattern 53 is narrow, the embroidery stitches are inclined. Therefore the length of the each embroidery stitch is increased thereby producing neat embroidery. Moreover, if an inclination angle α is altered, various effects on the embroidery can be formed.

As in the first example, although this example has been discussed using the outline 51, which is longer than the outline 52, as the base, or first, outline in step S23, the shorter outline 52 could be also used as the first outline in step S23 without departing from the scope of the invention. In addition, the inclination of the tangent L1 which is calculated in step S30 can be obtained by calculating the function showing the first outline 51 and differentiating the function.

It should be understood that many changes and modifications may be made in the examples without departing from the scope of the present invention. For instance, it may be used that an inclination angle α can be set automatically according to the pattern or the width between outlines. Further, it may be that the embroidery executing direction and the thread density can be input through the keyboard by an operator.

What is claimed is:

1. An embroidery machine which forms embroidery stitches based on embroidery data representing stitch positions, comprising:

storing means for storing pattern data which represents outlines of a pattern area to be filled with embroidery stitches formed by said embroidery machine;

outline setting means for setting a pair of facing outlines which extend in a predetermined embroidery executing direction based on the pattern data stored in said storing means and for designating one outline of the pair of facing outlines as a base outline;

inclination angle input means for defining an inclination angle of each of the embroidery stitches with respect to the predetermined embroidery executing direction;

stitch position calculation means for calculating stitch positions on said base outline set by said outline setting means and calculating a successive stitch position based on the inclination angle defined by said inclination angle input means for each base outline stitch position on a second outline of said pair of outlines;

embroidery data producing means for producing embroidery data based on the stitch positions calculated by said stitch position calculating means; and means for embroidering based upon the embroidery data.

2. The embroidery machine according to claim 1, wherein said inclination angle input means includes manual setting means for manually setting the inclination angle.

3. An embroidery machine which forms embroidery stitches based on embroidery data representing stitch positions, comprising:

storing means for storing pattern data which represents outlines of a pattern area to be covered with embroidery stitches formed by said embroidery machine;

outline setting means for setting a pair of facing outlines which extend in a predetermined embroidery executing direction based on the pattern data stored in said storing means and for designating one of said pair of facing outlines as a base outline;

inclination angle input means for defining an inclination angle for the embroidery stitches with respect to the predetermined embroidery executing direction;

stitch point setting means for setting stitch points on said base outline;

straight line calculating means for calculating a straight line for each stitch point on said base outline which inclines at the inclination angle defined by said inclination angle input means;

stitch position calculating means for calculating an intersection on a second outline where said straight line calculated by said straight line calculating means intersects said second outline of said pair of outlines set by said outline setting means and for setting the intersection as a stitch position;

embroidery data producing means for producing embroidery data based on the stitch positions set by said stitch point setting means and said stitch position calculating means; and means for embroidering based upon the embroidery data.

4. The embroidery machine according to claim 3, wherein said inclination angle input means includes manual setting means for manually setting the inclination angle.

5. An embroidery machine which formed embroidery stitches based on embroidery data representing stitch positions comprising:

storing means for storing pattern data which represents outlines of a pattern area to be covered with embroidery stitches formed by said embroidery machine;

outline setting means for setting a pair of facing outlines which extend in a predetermined embroidery executing direction based on the pattern data stored in said storing means;

inclination angle input means for defining an inclination angle of each of the embroidery stitches with respect to the predetermined embroidery executing direction;

stitch position setting means for setting a stitch position on a first outline of the pair of the outlines set by said outline setting means;

straight line calculating means for calculating a straight line which passes through the stitch position set by said stitch position setting means and inclines the straight line at the inclination angle defined by said inclination angle input means with respect to the predetermined embroidery executing direction;

stitch position calculating means for calculating an intersection where the straight line calculated by said straight line calculating means intersects a second outline of the pair of outlines set by said outline setting means and for setting the intersection as a next stitch position following the stitch position set by said stitch position setting means;

embroidery data producing means for producing embroidery data based on stitch positions set by stitch position setting means and stitch position calculating means; and means for embroidering based upon the embroidery data.

6. The embroidery machine according to claim 5, wherein said stitch position setting means includes dividing means for dividing the first outline at equal intervals based on a predetermined thread density and for calculating a dividing position and said stitch position setting means sets the dividing position calculated by said dividing means at stitch positions.

7. The embroidery machine according to claim 5, wherein said stitch position setting means includes selecting means for selecting the first outline from the pair of the outlines set by said outline setting means.

8. The embroidery machine according to claim 7, wherein the selecting means compares a length of one outline of the pair of outlines with the other outline of the pair of outlines and selects a longer outline of the one and the other outlines as the first outline.

9. The embroidery machine according to claim 5, wherein said straight line calculating means includes tangent calculating means for calculating a tangent which passes the stitch position set by said stitch position setting means and is parallel with the predetermined embroidery executing direction and said straight line calculating means calculates the straight line which passes through the stitch position set by said stitch position setting means and inclines the line to the inclination angle defined by said inclination angle input means with respect to the tangent calculated by said tangent calculating means.

10. The embroidery machine according to claim 5, wherein said inclination angle input means includes manual setting means for manually setting the inclination angle.

11. The embroidery machine according to claim 7, further comprising an end line means for creating end lines connecting adjacent ends of each outline of said pair of outlines where the line set at the inclination angle intersects a respective end line.

12. The embroidery machine according to claim 11, wherein the end line means creates a phantom extension to a base outline to define a phantom stitch position for said straight line calculating means to use to create an inclined line that intersects the end line at a termination of the pattern area in the embroidery executing direction.

* * * * *